(12) United States Patent
Chu et al.

(10) Patent No.: US 7,843,818 B2
(45) Date of Patent: *Nov. 30, 2010

(54) INTELLIGENT BUFFERING PROCESS FOR NETWORK CONFERENCE VIDEO

(75) Inventors: Lon-Chan Chu, Bellevue, WA (US); Ido M. Ben-Shachar, Redmond, WA (US); Ivan J. Leichtling, Redmond, WA (US); Leonard Alan Collins, Carnation, WA (US); Claus T. Giloi, Redmond, WA (US); Yikang Xu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 961 days.

This patent is subject to a terminal disclaimer.

(21) Appl. No.: 11/356,935

(22) Filed: Feb. 17, 2006

(65) Prior Publication Data

US 2006/0153217 A1 Jul. 13, 2006

Related U.S. Application Data

(63) Continuation of application No. 09/992,731, filed on Nov. 14, 2001, now Pat. No. 7,133,362.

(51) Int. Cl.
*H04L 12/28* (2006.01)
*H04N 5/04* (2006.01)
(52) U.S. Cl. .................. 370/230; 370/235; 348/500
(58) Field of Classification Search ............... 370/235, 370/412, 428, 429; 348/423, 500, 412; 725/94, 725/144, 151

See application file for complete search history.

(56) References Cited

U.S. PATENT DOCUMENTS 4,588,857 A  5/1986  Arsem (Continued)

FOREIGN PATENT DOCUMENTS

JP          403225642          10/1991

(Continued)

OTHER PUBLICATIONS

Hilt, Volker et al., "A Light-Weight Repair Protocol for the Loss-Free Recording of MBone Sessions," Proceedings of the 21st International Conference on Distributed Computing Systems Workshops, Mesa, Arizona, Apr. 18-19, 2001, IEEE Computer Society, pp. 63-68.

(Continued)

*Primary Examiner*—Warner Wong
(74) *Attorney, Agent, or Firm*—Merchant & Gould P.C.

(57) ABSTRACT

In order to minimize the delay of the video images viewed by a network conference attendee, an intelligent buffering process (IB process) selectively discards video frames from at least one point, and in an embodiment, many network points, such as at "in" and/or "out" buffers of clients, servers, routers, etc. Packets of video frame data arrive at a buffer, which can fill to a predetermined limit if the packets cannot be forwarded due to delays or slow connections. To forward the most current video images, old frames in the buffer are discarded rather than forwarded. In a particular embodiment, when the buffer is full, the next arriving delta frame packet is discarded. To avoid distortion, each subsequent delta frame is discarded until a new key frame eventually arrives. If the buffer is still full when the key frame arrives, the buffer is purged and the new key frame is added.

15 Claims, 7 Drawing Sheets

U.S. PATENT DOCUMENTS

| | | | | |
|---|---|---|---|---|
| 5,398,072 | A * | 3/1995 | Auld | 375/240.25 |
| 5,434,848 | A | 7/1995 | Chimento, Jr. et al. | |
| 5,581,544 | A | 12/1996 | Hamada et al. | |
| 5,586,172 | A | 12/1996 | Sakurai et al. | |
| 5,710,591 | A | 1/1998 | Bruno et al. | |
| 5,764,641 | A | 6/1998 | Lin | |
| 5,768,258 | A | 6/1998 | Van As et al. | |
| 5,909,224 | A * | 6/1999 | Fung | 345/531 |
| 5,949,948 | A * | 9/1999 | Krause et al. | 386/6 |
| 6,016,166 | A * | 1/2000 | Huang et al. | 348/515 |
| 6,034,731 | A * | 3/2000 | Hurst, Jr. | 375/240.26 |
| 6,081,299 | A * | 6/2000 | Kesselring | 348/512 |
| 6,151,621 | A * | 11/2000 | Colyer et al. | 709/204 |
| 6,226,668 | B1 | 5/2001 | Silverman | |
| 6,233,317 | B1 | 5/2001 | Homan et al. | |
| 6,606,306 | B1 * | 8/2003 | Lin et al. | 370/261 |
| 6,697,341 | B1 * | 2/2004 | Roy | 370/260 |
| 6,970,640 | B2 * | 11/2005 | Green et al. | 386/68 |
| 6,985,188 | B1 * | 1/2006 | Hurst, Jr. | 348/553 |
| 7,027,713 | B1 * | 4/2006 | Hallberg | 386/68 |
| 7,184,100 | B1 * | 2/2007 | Wilf et al. | 348/700 |
| 7,433,406 | B2 * | 10/2008 | Bayrakeri et al. | 375/240.1 |
| 2001/0036157 | A1 | 11/2001 | Blanc et al. | |
| 2002/0038374 | A1 * | 3/2002 | Gupta et al. | 709/231 |
| 2003/0053792 | A1 * | 3/2003 | Janevski | 386/46 |
| 2003/0067877 | A1 * | 4/2003 | Sivakumar et al. | 370/232 |

FOREIGN PATENT DOCUMENTS

| | | |
|---|---|---|
| JP | 407014016 | 1/1995 |
| JP | 408023526 | 1/1996 |
| JP | 0200350173 | 12/2000 |

OTHER PUBLICATIONS

Holdfelder, Wieland, "Interactive Remote Recording and Playback of Multicast Videoconferences," Computer Communications 21 (1998), pp. 1285-1294.

Lambrinos, Lambros et al., "The Multicast Multimedia Conference Recorder," Proceedings of the 7th International Conference on Computer Communications and Networks, Lafayette, Louisiana, Oct. 12-15, 1998, IEEE Computer Society, pp. 208-213.

\* cited by examiner

INTELLIGENT BUFFERING PROCESS FOR NETWORK CONFERENCE VIDEO

CROSS-REFERENCE TO RELATED APPICATION(S)

This application is a continuation of U.S. patent application Ser. No. 09/992,731 entitled "INTELLIGENT BUFFERING PROCESS FOR NETWORK CONFERENCE VIDEO," filed on Nov. 14, 2001, which application is hereby incorporate by reference in its entirety.

TECHNICAL FIELD

This invention relates generally to conferencing on computer networks and more particularly relates to a process for intelligently buffering video frame data for an online conference.

BACKGROUND OF THE INVENTION

Multipoint online video conferences have increased in popularity as an efficient way to conduct meetings over local area networks (LANs) or wide area networks (WANs), such as the Internet. These conferences include the exchange of audio, video and sometimes sharing drawings, documents, or other application data among multiple "attendees."

In order to provide a satisfying conference experience to the users, the conference video images must be viewed by attendees as close as possible to real time. However, streaming multimedia over the Internet is not truly "real time" because such packet-switched technology has inherent data flow inconsistencies. Network traffic variations cause packets to flow in inconsistent intervals, and buffering is needed to smooth out a multimedia stream.

Except for audio and video, Internet transmissions are commonly conducted under "lossless," verified-delivery protocols, such as Transmission Control Protocol/Internet Protocol (TCP/IP). Such a protocol ensures that each packet sent is actually received and sequentially reassembled by the intended destination. Unfortunately, although a verified-delivery protocol may enhance reliability of some types of Internet data, the nature of the resulting data flow is problematic for the delivery video conference data in a timely manner.

As is generally known, the sender under TCP/IP must receive a verification message that a sent batch of packets were actually received by the intended recipient within a predetermined time, otherwise lost packets must be retransmitted. TCP/IP further reassembles packets at the destination in the order originally sent, and accordingly, this reassembly is delayed until missing packets have been resent. The characteristic delay in a TCP/IP communication caused by the non-arrival and subsequent retransmission of packets is commonly referred to as a "hiccup." These TCP/IP hiccups result in unacceptable time lags for interactive video conferences. When congestion clears after each hiccup, current system buffers release a long burst of packets containing video frames already several seconds old. The video seen by the conference attendee becomes behind, and remains behind, for the remainder of the conference.

In order to keep up with the conference, it is desirable to display frames in "real time," wherein a delay between displayed frames is the same as the delay between when the frames were captured.

Studies have determined that, on average, a person can perceive a delay of about 150 ms or more. Unfortunately, delays exceeding that length are frequently unavoidable over the Internet. For example, an Internet transmission of a data packet between New York and Los Angeles typically takes about 200 ms in each direction. Even though such a lag is perceptible, a satisfactory video conference experience would still possible if delays were limited to these short transmission delays. However, a conference experience becomes significantly impaired when a verified-delivery protocol mandates verification activities that extend the delay. In a TCP/IP hiccup situation, for example, time is consumed by the initial transmission, the verification period, and the retransmission, as well as video processing time at the sending and receiving computers. It has been found that a hiccup in a coast-to-coast TCP/IP transmission results as an average total lag time of about 1.5 seconds between the time that a video frame is created and ultimately received. This causes a 1.5 second delay in the video displayed by the receiver for the duration of the conference. Furthermore, it has been found that, on average, about two percent of packets must be resent, and numerous hiccups over the course of a conference result in a significant cumulative delay in the video stream. Under such conditions, an attendee would view conference video that falls behind several seconds each minute. Such woefully late video would be of little use to a conference attendee whose ability to meaningfully participate may be diminished as a result.

Some conference transmissions have been carried out over the Internet using non-standard protocols which do not verify packet delivery or retransmit lost packets. User Datagram Protocol (UDP) is a generally known example of such a protocol. Unfortunately, firewalls are typically set up to block communications under such non-standard protocols, undesirably limiting the attendees who can access the conference. Most firewalls do, however, permit TCP/IP communications to pass. Therefore, a need exists for a conference system which minimizes video transmission delays over the Internet, yet which can be implemented with a verified-delivery protocol such as TCP/IP in order to maximize access to attendees whose network connection passes through a firewall.

A video data stream includes sequential image frames which are packetized for sending over a network. Each of these packets contains data associated with a video frame image. Most compression/decompression (codec) algorithms encode a video stream so that only some of the frames are sent in their entirety. For example, Advanced Streaming Format (ASF) and Windows Media Video (WMV) send periodic key frames, and a series of delta frames are sent between key frames at a higher frequency. Each of the key frames contains all data necessary to construct an entire frame image, but each delta frame is encrypted to contain data representing only changes in the frame image relative to the immediately preceding frame. The key frames and delta frames are then packetized for transmission over the network. Notably, if a frame is somehow dropped or lost, a subsequent delta frame would not correspond with the last-displayed delta frame or key frame, causing the subsequently displayed video image to distort or "bubble." This type of distortion would cumulatively worsen with each additional delta frame until the next key frame is displayed.

Various solutions have been contemplated to permit a conference attendee to catch up from delayed, buffered-up video. For example, it is possible to play delayed segments of old video at a faster-than-normal rate, but the resulting fast video spurts are undesirably distracting. Accordingly, a need exists for a process which helps a conference attendee to catch up from network delays to the extent possible, while optimizing image quality received by each attendee.

SUMMARY OF THE INVENTION

The present invention generally provides an intelligent buffering process (referred to hereinafter as "IB process") and associated method of managing conference communications. The IB process controls the flow of data to prevent network conference attendees from falling behind due to network congestion, transmission glitches, or slow connection speeds.

An implementation of the IB process is particularly useful for a live, interactive conference environment wherein it is desirable to avoid video lag time. It has been found that video containing a reduced number of frames can still provide an attendee with a satisfactory conference experience. Moreover, it has been found that viewing a timely video with occasional deleted frame segments is preferable to permitting an attendee from falling behind in a conference with a significantly delayed, albeit complete, video stream.

Accordingly, in an exemplary embodiment, the IB process is implemented in one or more buffers to intelligently discard video frame packets if the buffer exceeds a predetermined content limit. The buffers may fill up during periods of data flow resistance caused by network congestion, packet verification hiccups, processing delays, etc. When a particular buffer becomes full, the IB process intelligently discards each newly arriving video packet which does not contain a key frame until the next key frame packet is received. When the key frame packet eventually arrives, the entire buffer is cleared out and the key frame packet is inserted as the only packet in the buffer. As a result, that the end user will see a paused, but not distorted, video image during periods of congestion or transmission glitches. When the data transmission picks up, the video restarts with the most current key frame. The paused video effect is much less distracting to a viewer than would be distorted video or fast-played video bursts. The IB process permits the slow users to quickly catch up from network transmission lags, while at the same time providing high quality video without disruption to attendees having a speedier connection.

The IB process can take place at a variety of points in a network conference system. For example, the IB process is implemented in sending and receiving buffers at a client or "attendee" machine, network conference server, a LAN server, a router, bridge, gateway device, and at any machine having a controllable processor and memory. In an embodiment, the IB process is implemented at each media-relay or network router that recognizes the format of the data stream. In a conference server embodiment, wherein the server is routing conference video to multiple destinations, the outgoing video packets directed to each respective destination or attendee are independently buffered according to the IB process. Video frames are discarded only from a stream directed over a slow network connection, not from streams experiencing normal data flow. Accordingly, a conference attendee who has a normal network connection is not penalized.

In an embodiment, the present invention provides a process for managing conference communications which implements the steps of the IB process. The process for managing conference communications is useful for implementation at the conference server to control data flow for optimal video quality to each attendee.

Additionally, the IB process can be implemented between any protocol or application layers running on a particular machine which are above a TCP layer.

An advantage of the present invention is that it provides an intelligent buffering process which avoids lags caused by data-forwarding delays.

Another advantage of the present invention is that it provides an intelligent buffering process which permits a user who is experiencing a slow network connection to catch up when network flow is bursty.

A further advantage of the present invention is that it can be implemented to reduce video lag in transmissions under a verified delivery protocol, such as TCP.

Yet another advantage of the present invention is that it provides an intelligent buffering process which avoids displaying distorted video images.

In an embodiment, a further advantage is that it provides a process managing a network conference video which intelligently buffers independently relative to each attendee. A related advantage of the present invention is that it allows a conference attendee on a slow network connection to catch up from network lags without penalizing conference attendees who are not experiencing a slow connection.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 4a-4h are schematic diagrams showing video data buffering at various stages of the IB process:

FIG. 4g illustrates the subsequent discarding of the delta frame.

DETAILED DESCRIPTION OF THE INVENTION

Figure 1:
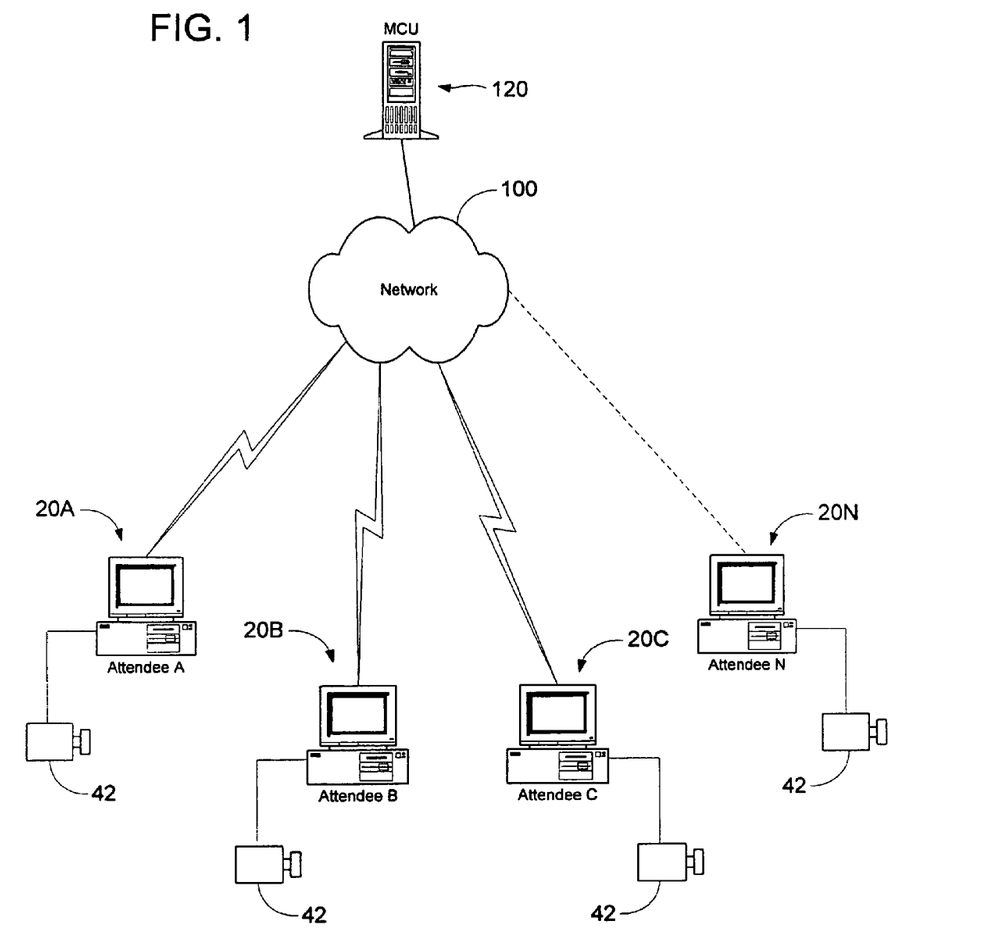
FIG. 1 is a schematic diagram of a network of computers for conducting a video conference.

Turning to the drawings, wherein like reference numerals refer to like elements, the invention is described hereinafter in the context of suitable networking and computing environments. FIG. 1 illustrates a conference system including a plurality of attendee computers 20A, 20B, 20C, and 20N in communication over a network 100 for conducting a video conference in accordance with teachings of the invention. Each of the attendee computers 20A-20N is the site of a respective conference attendee A-N. It should be understood that the network 100 can include the Internet, another type of WAN, or one or more LAN.

Each of the participating attendee computers is preferably equipped with a video camera 42 to transmit video data over the network 100 as part of a conference data stream received by the attendee computers 20A-20N. Notably, an attendee without a camera or microphone could also join the conference to "listen." It will further be understood that the conference can be conducted among any number of attendee computers, two or more, depending on available resources.

In the exemplary embodiment of FIG. 1, the conference system includes a host or conference server, referred to herein as a Multipoint Conferencing Unit (MCU) 120. The MCU 120 handles routing of conference video among the various attendee computers 20A-20N. The MCU 200 administers conference communications over the network 100 among the attendee computers 20A-20N.

Those skilled in the art will recognize that the attendee computers 20A-20N can also be connected for conference communications according to various other appropriate architectures, such as peer-to-peer arrangements. Additionally, it will be understood that conference video can be handled according to a variety of video schemes depending on the needs of the attendees and available bandwidth. For example, in an embodiment, each of the attendees receives the same, single video image. The image can be selected by a designated meeting moderator who can switch the image sent to all attendees during the conference. In another embodiment, where the network has sufficient bandwidth, multiple streaming video images may be sent to some or all of the attendees.

Although it is not required for practicing the invention, the invention is described as it is implemented by computer-executable instructions, such as program modules, that are executed by a PC (PC). Generally, program modules include routines, programs, objects, components, data structures and the like that perform particular tasks or implement particular abstract data types.

The invention may be implemented in computer system configurations other than a PC. For example, the invention may be realized in hand-held devices, multi-processor systems, microprocessor-based or programmable consumer electronics, network PCs, minicomputers, mainframe computers and the like. The invention may also be practiced in distributed computing environments, where tasks are performed by remote processing devices that are linked through a communications network. In a distributed computing environment, program modules may be located in both local and remote memory storage devices. Although the invention may be incorporated into many types of computing environments as suggested above, the following detailed description of the invention is set forth in the context of an exemplary general-purpose computing device in the form of a conventional PC 20.

Before describing the invention in detail, the computing environment in which the invention operates is described in connection with FIG. 2.

The PC 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the PC 20, such as during start-up, is stored in ROM 24. The PC 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the PC 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the PC 20 through input devices such as a keyboard 40 and a pointing device 41. In an embodiment wherein the PC 20 participates in a multimedia conference as one of the attendee computers 20A-20N (FIG. 1), the PC also receives input from a video camera 42 and microphone 43. Other input devices (not shown) may include a joystick, game pad, satellite dish, scanner, or the like. These and other input devices are often connected to the processing unit 21 through a serial port interface 44 that is coupled to the system bus 23, but may be connected by other interfaces, such as a parallel port, game port or a universal serial bus (USB). A monitor 45 or other type of display device is also connected to the system bus 23 via an interface, such as a video adapter 46. In addition to the monitor, the PC includes a speaker 47 connected to the system bus 23 via an interface, such as an audio adapter 48. The PC may further include other peripheral output devices (not shown) such as a printer.

Figure 2:
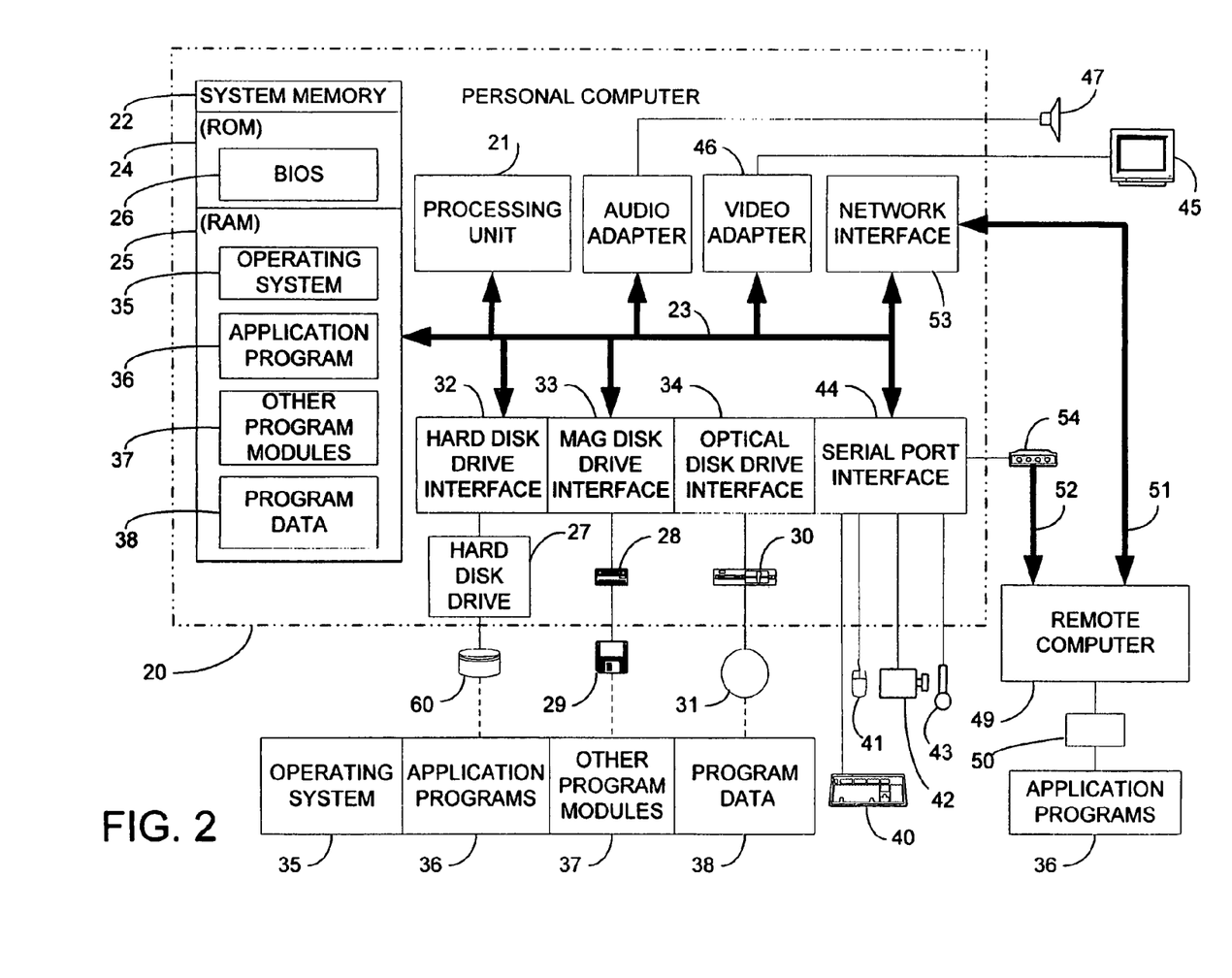
FIG. 2 is a block diagram generally illustrating an exemplary computer system on which the IB process can be executed.

The PC 20 of FIG. 2 may operate in the network environment using logical connections to one or more remote computers, such as a remote computer 49 which may represent another PC, for example, a conference server such as the MCU 120 of FIG. 1, a LAN server, a router, or a peer device such as one of the attendee computers 20A-20N of FIG. 1. The remote computer 49 typically includes many or all of the elements described above relative to the PC 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the PC 20 is connected to the local network 51 through a network interface or adapter 53. When used in a WAN networking environment, the PC 20 typically includes a modem 54 or other means for establishing communications over the WAN 52. The modem 54, which may be internal or external, is connected to the system bus 23 via the serial port interface 44. In a networked environment, program modules depicted relative to the PC 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Turning back to FIG. 1, each of the client or attendee computers 20A-20N has software capable of processing, playing and generating multimedia audio and video. The software can be adapted for implementation with a variety of appropriate multimedia encoding formats, as are generally known. In the embodiment wherein a server such as the MCU 120 is provided to direct the communications among the attendee computers 20A-20N, the MCU 120 is also loaded with a version of such software which includes the appropriate routing functionality. The software can be downloaded to the attendee computers prior to the conference or provided on some recorded medium, such as an optically readable disc, a magnetically readable disc or tape, or some other known medium.

Certain events or conditions can restrict the data flow over the network 100 to or from any of the attendee computers 20A-20N. As discussed in the background, for example, data forwarding delays can occur from network congestion or protocol related hiccups due to verification and retransmission of lost packets. Additionally, data backups can occur at a particular server or client computer due to processing delays. Moreover, an attendee may have a relatively slow modem (e.g., a 28.8 kbps modem). Network congestion often affects data flow at only part of the network and may have no effect on some of the attendee computers 20A-20N.

According to an aspect of the invention, in order to promote the timely transmission of video data while avoiding distortion, an intelligent buffering process and system are provided to optimize timely video delivery by forwarding at least some of the video frames, but to selectively avoid forwarding certain old video frames backed up in a buffer or frames that would likely cause distortion. The IB process permits an end recipient of the video data to "catch up" from system delays after the downstream congestion has cleared. The IB process may be implemented as a feature of the conferencing software running at any or all of the attendee computers 20A-20N, MCU 120, and/or any network machine through which the conference video data flows.

In general, the IB process is useful for buffering a video data stream which has been encoded as packets defining key frames and delta frames. Each of the key frames contains all data needed to construct an entire frame image, but each of the delta frames is encrypted to contain data representing only image changes relative to the immediately preceding frame (key or delta). A conventional video stream is compressed to contain key frames at periodic intervals, such as one key frame every eight seconds. A string of delta frames is generated at a faster rate after each key frame, such as one every one-tenth of a second. Herein, the term "key frame" and the element letter K designate a packet containing a key frame, and the term "delta frane" and the element letter D designate a packet which does not contain a key frame and which contains at least one delta frame. In an embodiment, a packet includes only one delta frame. It should be further understood that the term "packet" as used herein includes a unit of data transmitted as a whole from one device to another on a network, but also includes a unit of data transferred between application or protocol layers on the same machine, as will be explained below in connection with FIG. 6.

Figure 3:
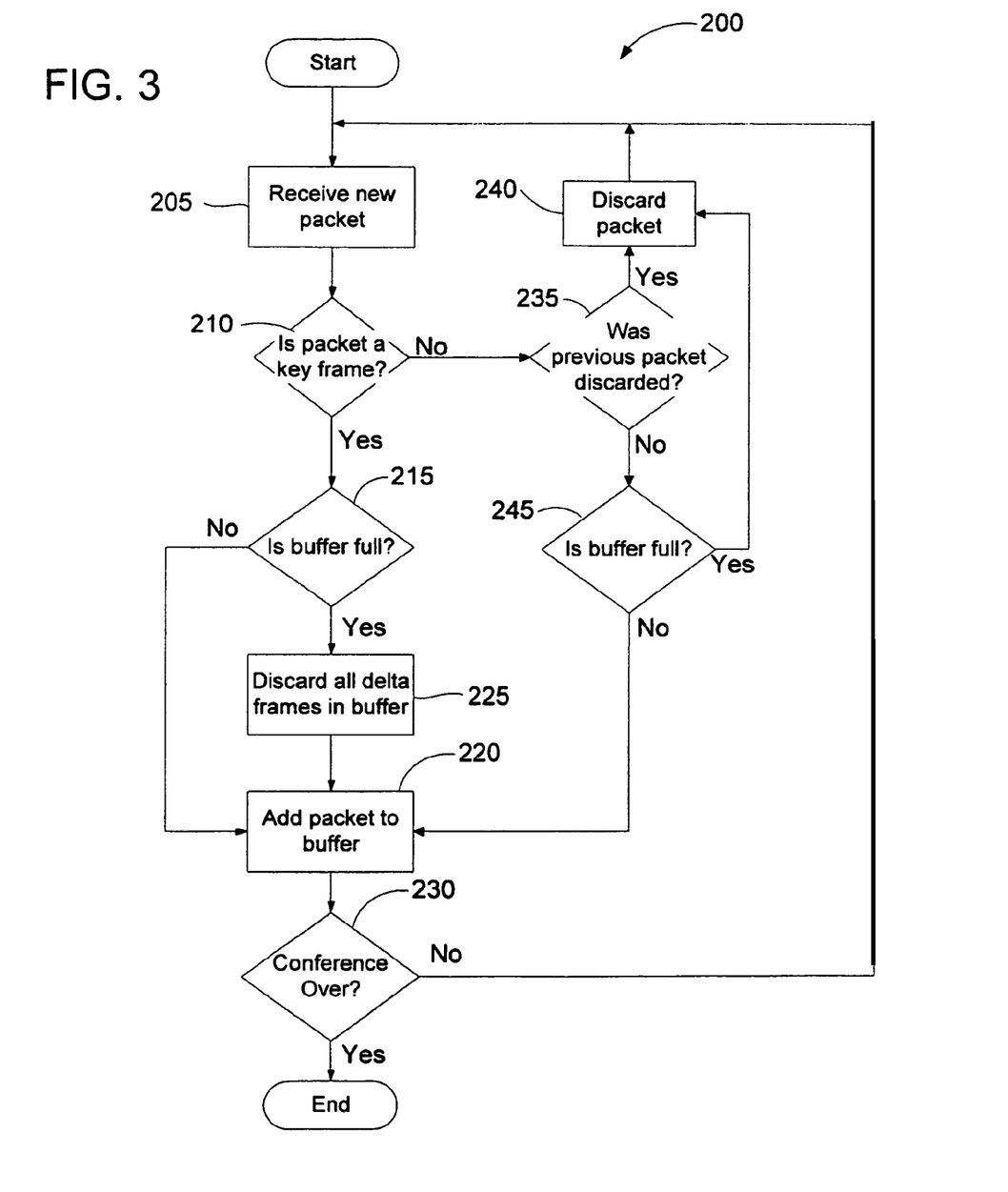
FIG. 3 is a flow chart illustrating an exemplary intelligent buffering process.

FIG. 3 is an overall flow diagram illustrating steps of an exemplary IB process 200. FIG. 3 will be described together with FIGS. 4a-4e, which schematically illustrate the buffering of video frame data according to the IB process 200. In general, the IB process promotes the forwarding of conference video images as soon as reasonably practical to the time which it the images are created.

A region of memory is reserved as a video buffer 300, as shown in FIGS. 4a-4h for receiving and temporarily storing a queue of packets K and D. The buffer 300 has a predetermined content limit B. As used herein, the term buffer content and the element letter Q refers to a quantitative amount of packets K, D residing in the buffer 300 at any given time.

In general, when certain conditions are met as explained below, the IB process permits newly arriving key frame or delta frame data packets to be added to the buffer. It should be understood that once in the buffer, the video frame packets K, D are released in a conventional manner from a first buffer position (the rightmost position in the buffer 300 of FIGS. 4a-4h) on a first-in-first-out basis as permissible by the protocol conditions of the network or device downstream. As long as the buffer 300 can release frames at about an expected rate based on normal network flow conditions, the buffer content Q remains within the buffer limit B, such as in FIG. 4a. However, it should also be understood that the buffer content Q grows during periods when the data cannot be forwarded from the buffer 300 as quickly as new packets are arriving. At times, the buffer can become full—the buffer content Q reaches the predetermined buffer limit B, as shown in FIG. 4c.

Now, the IB process 200 will be described in greater detail, setting forth the conditions upon which a newly arrived packet K or D is added to the buffer 300. At step 205 of the IB process 200 shown in FIG. 3, a newly arriving video frame packet K or D is received from a sender. A newly arrived packet is not added to the buffer 300 at step 205, but the packet is effectively at an entry threshold.

At step 210 (FIG. 3), the IB process 200 determines whether the new packet contains a key frame. As is known by those of skill in the art, this can be determined in various ways such as by an indicator in a header of the packet.

Initially, the situation is considered wherein the packet contains a key frame. If the packet is determined at step 210 to contain a key frame, the IB process 200 of FIG. 3 determines whether the buffer is full in step 215. If the buffer is not full, the IB process 200 adds the packet K to the buffer at step 220.

Figure 4A:
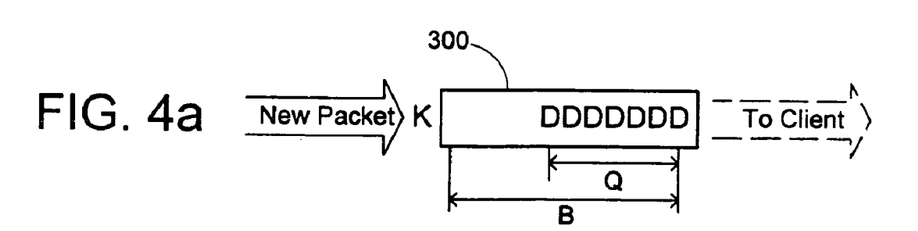
FIG. 4a illustrates key frame arriving at a partially full buffer.
Figure 4B:
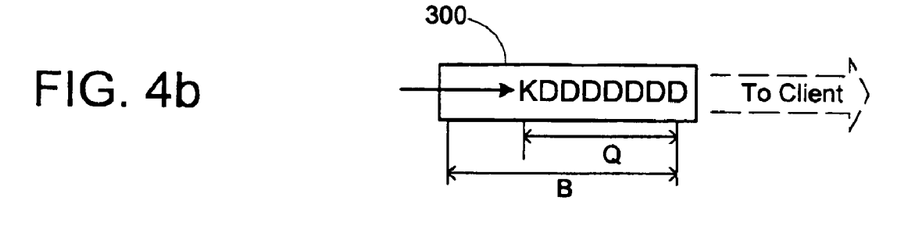
FIG. 4b illustrates the subsequent addition of the key frame in a queue with the previous frames.
Figure 4C:
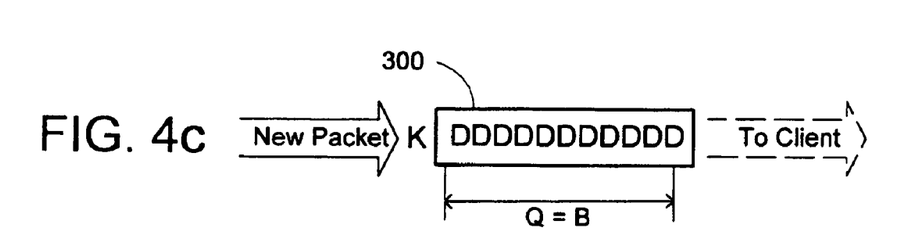
FIG. 4c illustrates a key frame arriving at a full buffer.

FIGS. 4a and 4b illustrate the arrival of a key frame packet K under the conditions just described in connection with steps 205, 210, 215 and 220 of FIG. 3. In FIG. 4a, a key frame packet K arrives (from the left) at the buffer 300 at a moment when the buffer content Q is less than the buffer limit B. Therefore, the newly arrived key frame packet K is added sequentially behind any other packets in the buffer 300, as illustrated in FIG. 4b.

On the other hand, if the buffer is full when the key frame packet arrives, referring back to FIG. 3, the IB process 200 goes to step 225 and discards all of the currently buffered packets. The newly arrived key frame packet K is then added at step 220 as the only packet in the buffer.

Figure 4D:
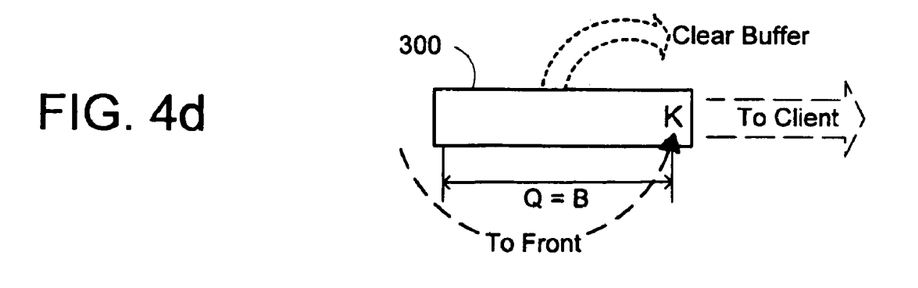
FIG. 4d illustrates the subsequent discarding of buffer contents and adding the key frame as the only frame in the buffer.

FIGS. 4c and 4d illustrate the conditions addressed by step 225. More specifically, FIG. 4c illustrates the arrival of new packet K at a moment when the content Q of packets (shown as delta frames D in FIG. 4c) in the buffer 300 is at the buffer limit B (Q=B). The IB process deletes all of the packets in the buffer 300, thereby clearing memory for the new packet K to be placed at the first buffer position, as shown in FIG. 4d. Here, the new packet K is the only packet in the buffer.

As shown in FIG. 3, after the newly arrived key frame has been added by step 220, the IB process 200 determines whether the conference has ended at step 230. If the conference has not ended, the IB process 200 returns to step 205 to receive the next arriving packet. Those of skill in the art that an end of the conference can be determined in various ways. For example, the MCU can send a data packet containing a flag which indicates a termination of conference. Such a packet can be sent at a predetermined time or in response to a signal by an authorized attendee or conference moderator.

Now the IB process 200 of FIG. 3 will be described when step 210 determines that the newly arrived packet is not a key frame K, but rather a delta frame D. Here, the IB process 200 moves to step 235 which determines whether the previous frame was discarded. If so, step 240 automatically discards the newly arrived delta frame D. As explained above, if the previous frame was discarded, an attempt to process the next delta frame D would cause distortion, because each delta frame D is encoded in an abbreviated manner to depend upon the information in a preceding frame. Accordingly, in order to avoid distortion, step 235 automatically discards every delta frame D which follows any discarded frame until the arrival of a new key frame K. To display the next key frame K would not inherently cause distortion, because each key frame K contains all data needed to construct an entire frame image.

Still referring to FIG. 3, if the previous packet was not discarded, the process 200 moves from step 235 passes to step 245, which determines whether the buffer is full.

In order to avoid distortion, the IB process does not discard data arbitrarily. If a video buffer were to be arbitrarily cleared in an attempt to catch up from a time lag, the next arriving data packet will most likely contain a delta frame, not a key frame, resulting in "bubbling" distortion until the arrival of the next key frame. Thus, according to the process 200, if the buffer is full, the delta frame is automatically discarded according to step 220. Again, this would trigger an automatic discarding of each consecutive delta frame D which subsequently arrives until the next key frame K.

Figure 4E:
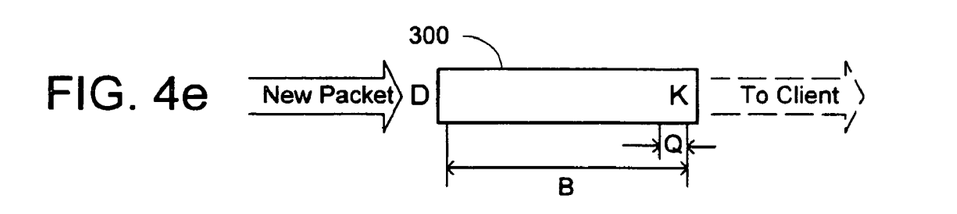
FIG. 4e illustrates a delta frame arriving at the buffer immediately subsequent to the key frame of FIG. 4d.
Figure 4F:
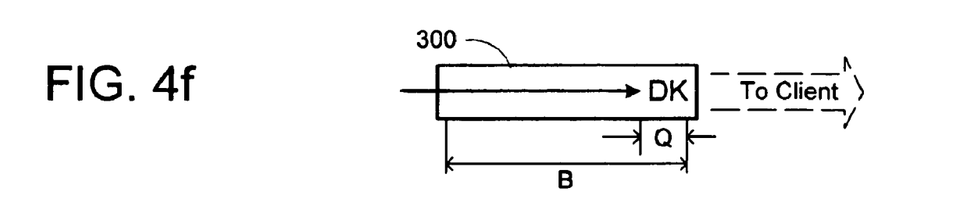
FIG. 4f illustrates the delta frame being inserted in the buffer at a position immediately after the key frame.
Figure 4G:
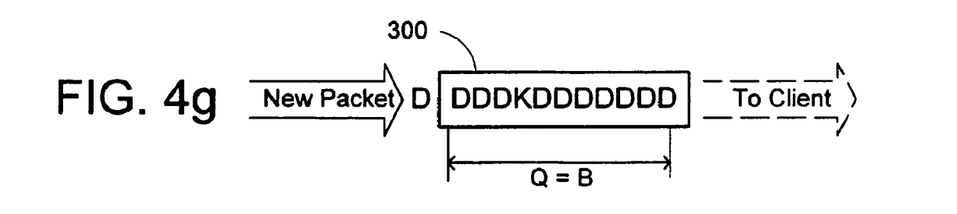
FIG. 4g illustrates a delta frame arriving at a full, backed-up buffer which has reached its predetermined limit.
Figure 4H:
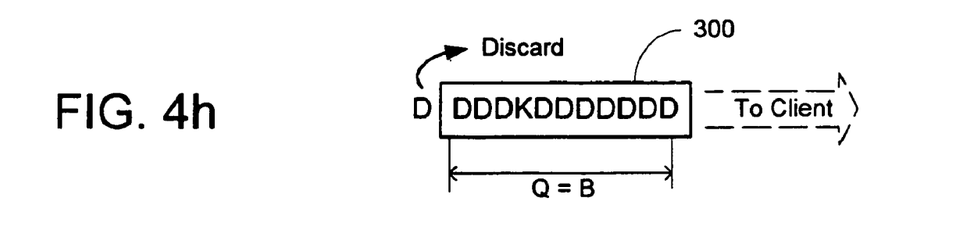

FIGS. 4g and 4h illustrate the condition addressed by steps 245-to-240 (FIG. 3). In FIG. 4g, the buffer 300 is full, because the buffer contents Q are at the limit B. Accordingly, the newly arrived delta frame D is discarded, as illustrated in FIG. 4f. Notably, if buffered packets are subsequently forwarded from the buffer 300 so that the buffer content Q was less than the limit B, each consecutively arriving delta frame D would continue to be discarded until a new key frame has been added to the buffer.

A full-buffer condition (Q=B) could happen, for example, in an embodiment wherein the buffer 300 is used as an "out" buffer to stage packets prior to sending over the network, and network congestion or a TCP hiccup delay can prohibit the buffer 300 from forwarding the buffered packets K, D at a desired rate. Additionally, in an embodiment wherein the buffer 300 is used to stage data between protocol or application layers running on a given machine, for example, as will be discussed in greater detail below, a lack of processing resources for downstream activities can also hold up the forwarding of packets out of the buffer. Such a processing delays can happen, for example, if one of the attendee computers 20A-20N or the MCU 120 (FIG. 1) is running a separate application concurrently with the conference software. An intensive application such as a software compiler or mathematically-intensive application would be particularly likely to result in processing delays.

Referring back to FIG. 3, if step 245 determines that the buffer is not full, the newly arrived delta frame D is added to the buffer at step 220. This condition is illustrated by FIGS. 4e and 4f. Particularly, FIG. 4e illustrates the arrival of a new delta frame D, which immediately follows a non-discarded frame K residing in the buffer 300. The buffer content Q is less than the buffer limit B at this moment, so the new delta frame D is added to the buffer 300 behind the previous packet K as illustrated in FIG. 4f.

The end-user experience resulting from the IB process performed on video sent to a particular attendee is that the attendee sees paused video during network lags. Each time the IB process discards a frame, the recipient attendee sees video paused at the image of the most recently transmitted frame. When the congestion clears, the video starts again with the next transmitted key frame. In a case where the user is on an a very slow link, rather than just getting sporadic network hiccups, that attendee could see only periodic key frames. In an embodiment, the slow attendee could signal the sender to send only key frames, thereby reducing bandwidth and avoid the futility of not being able to keep up.

To enable appropriate processing of the video stream, each of the video packets K, D has a header which contains a time stamp indicating the time at which the packet was originally created by the respective sending attendee. This time stamp information can be used by the next destination, for example the MCU 120 or the other attendees 20A-20N to reassemble the packets in proper sequence. Additionally, the multimedia conference software may use the time stamp information to appropriately synchronize audio and video data.

The IB process is preferably performed at multiple points of the network conference. Delivery timeliness can be enhanced by each point benefits at which the IB process is implemented between creation by one attendee computer and display on the monitor of another attendee computer. Desirably, the IB process is performed on the video packets at each client and server machine involved in a conference which can be accessed and controlled to implement the IB process. Additionally, whether intelligent buffering is performed at the server or client, it is desirable to implement the IB process separately for the video stream to or from each of the attendee computers whenever such independent buffering would optimize the number of frames viewed by the other respective attendees.

For example, with reference to FIG. 1, each of the attendee computers 20A-20N preferably performs the IB process 200

(FIG. 3) as "out" buffering which queues the respective key frame and delta frame packets generated by that attendee prior to sending over the network 100. By independently throttling the data being sent from each respective attendee, the sending timeliness is optimized for each attendee, even if some of the attendees are connected to the network over a slower links than others. Advantageously, the attendees who can transmit video at full frame rates are not limited from doing so.

Additionally, each of the attendee computers 20A-20N (FIG. 1) can also run the IB process as "in" buffering of the key frame and delta frame packets received from the network 100. This primarily benefits an attendee who has processor which may be periodically occupied to run a separate application concurrently with the conference, or if the attendee computer simply has a much slower processor than the other attendees. Although the processor could not keep up with processing and displaying all incoming video frames, the IB process would discard frames in a manner to help keep that attendee caught up with the conference. By independently throttling the incoming data to each attendee computer, the number of frames viewed by the various attendees is optimized.

Figure 5:
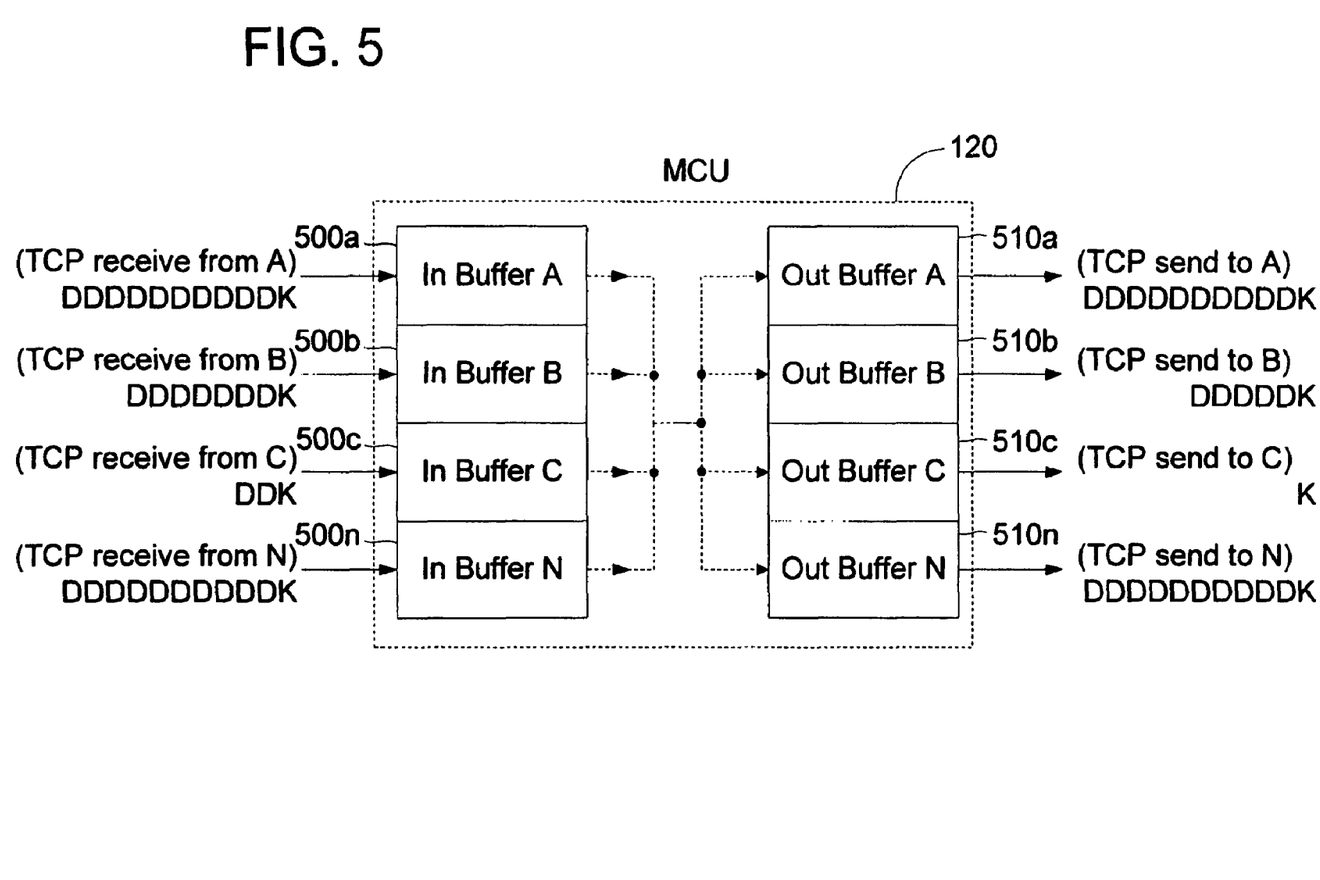
FIG. 5 is a schematic diagram of a stack containing various protocol and application layers, the IB process being executed between any or all of the layers above the TCP layer.

In an embodiment, with reference to FIG. 1, the IB process is implemented to manage buffers on the conference server or MCU 120, which routs the data to all of the attendees 20A-20N. FIG. 5 illustrates an exemplary implementation of the MCU 120 in which the IB process is independently performed as an "out" buffer on each of the video streams forwarded each respective attendee A-N in a multiple-unicast fashion.

Significant advantages are achieved by operating multiple "out" buffers 510a-510n at the MCU 120. By independently throttling the data with respect to each of the clients or attendees 20A-20N, the MCU 120 can optimize number of frames delivered in a timely manner to each. In particular, the MCU 120 of FIG. 5 implements the IB process at each "out" buffer 510a-510n to discard video packets only from data to be sent to an attendee who appears to be on a slow network connection. This "flow control" buffer management allows the server to reduce video bandwidth independently only for attendees that lack the bandwidth needed to support the full data stream. Attendees who are experiencing normal network flow are not penalized.

As illustrated in FIG. 5, for example, the various attendees A-N are able to receive frames at different rates. The attendees A and N are able to receive the stream of delta frames D and key frames K at the full frame rate, as attendees A and N are apparently connected over normal network conditions with adequately fast equipment. As a result, the out buffers A and N have discarded no frames relative to the illustrated input at the left hand side of FIG. 5. As illustrated to the right hand side of FIG. 5, the out buffers A and N did not discard any frames. In comparison, Attendee B appears to have a slower network connection, and as a result, the IB process passes a fewer number of frames to be sent to Attendee B. At the out buffer B, the IB process has discarded delta frames D because Attendee B is unable to receive data at the full frame rate, possibly due to network congestion or a TCP lost packet delay. Attendee C is on the slowest network connection, and as a result, the out buffer C has discarded many frames, having discarded all frames but the key frame K in the example shown relative to the input data.

Resources permitting, additional advantages can be achieved by performing the IB process at one or more "in" buffer at the MCU which receive transmission from the attendee computers. In the MCU 120 illustrated in FIG. 5, the IB process is independently operated as an "in" buffer on each of the incoming video streams received from the respective attendees A-N. This provides a benefit that the incoming video packets streams will not be delayed over moments when the processor at the MCU is busy.

Notably, the IB process is also useful to optimize frame rates among attendees having different network interface equipment. Notably, the IB process can achieve this benefit even in an embodiment wherein an identical stream is directed to each recipient. In an example, one attendee could be connected to the network with a low baud rate device such as a 28.8 kbps modem, while another attendee might have a much faster connection, such as a digital subscriber line (DSL), T1 or cable modem. The IB process would operate in the same manner to discard frames which are coming into the MCU server at a faster rate than can be delivered to the attendee with the low speed modem.

To enable the packets to be buffered in a conference communications sent under a verified-delivery protocol such as TCP/IP, the IB process takes place before or after a TCP/IP transmission over the network. For example, referring to FIG. 1, a first TCP/IP transmission occurs from an attendee computer such as 20A to the MCU. The IB process may be performed on the video data at the attendee computer 20A before this first TCP/IP transmission. Once the TCP transmission is received by the MCU, the IB process can be performed on these packets, for example, at the "in" buffers 500a-500n or the "out" buffers 510a-510n described in connection with FIG. 5, or within a conference protocol stack. Referring again to FIG. 1, another TCP/IP transmission occurs after packets have left the "out" buffers 510a-510n (FIG. 6) of the MCU 120 to each of the respective the attendee computers 20A-20N. The attendee computers 20A-20N can then respectively perform the IB process on the received video data again prior to displaying the images to the viewers. With regard to packets discarded at the MCU, those packets are never sent in the fresh TCP send from MCU to the attendee recipients. As a result of performing the IB process before or after TCP/IP transmissions, the IB process does not trigger the delivery-verification function of TCP/IP.

It will be understood by those skilled in the art that separate channels may be set up for transmission of various types of data. In the context of the conference described herein, separate channels can be set up for the various types of conference data, such as video, audio, and application sharing data, and these channels can be designated as having various delivery priorities. For example, in a conference environment it is sometimes desirable to designate audio data as having the highest priority. Accordingly, the audio is delivered on a high-priority channel, whereas application sharing and video data can be sent on a lower priority basis, such as together on a medium-priority channel. Buffering is performed independently for each data type sent over each channel, as the IB process would only be applied to the video data.

In an embodiment, the buffering algorithm is implemented at a multipoint conferencing protocol level. For example, T.120 is a well-known standard multipoint conferencing protocol which is suitable for a conference of the type described herein. This implementation would be plugged into the server buffers and lower-level client buffers.

Figure 6:
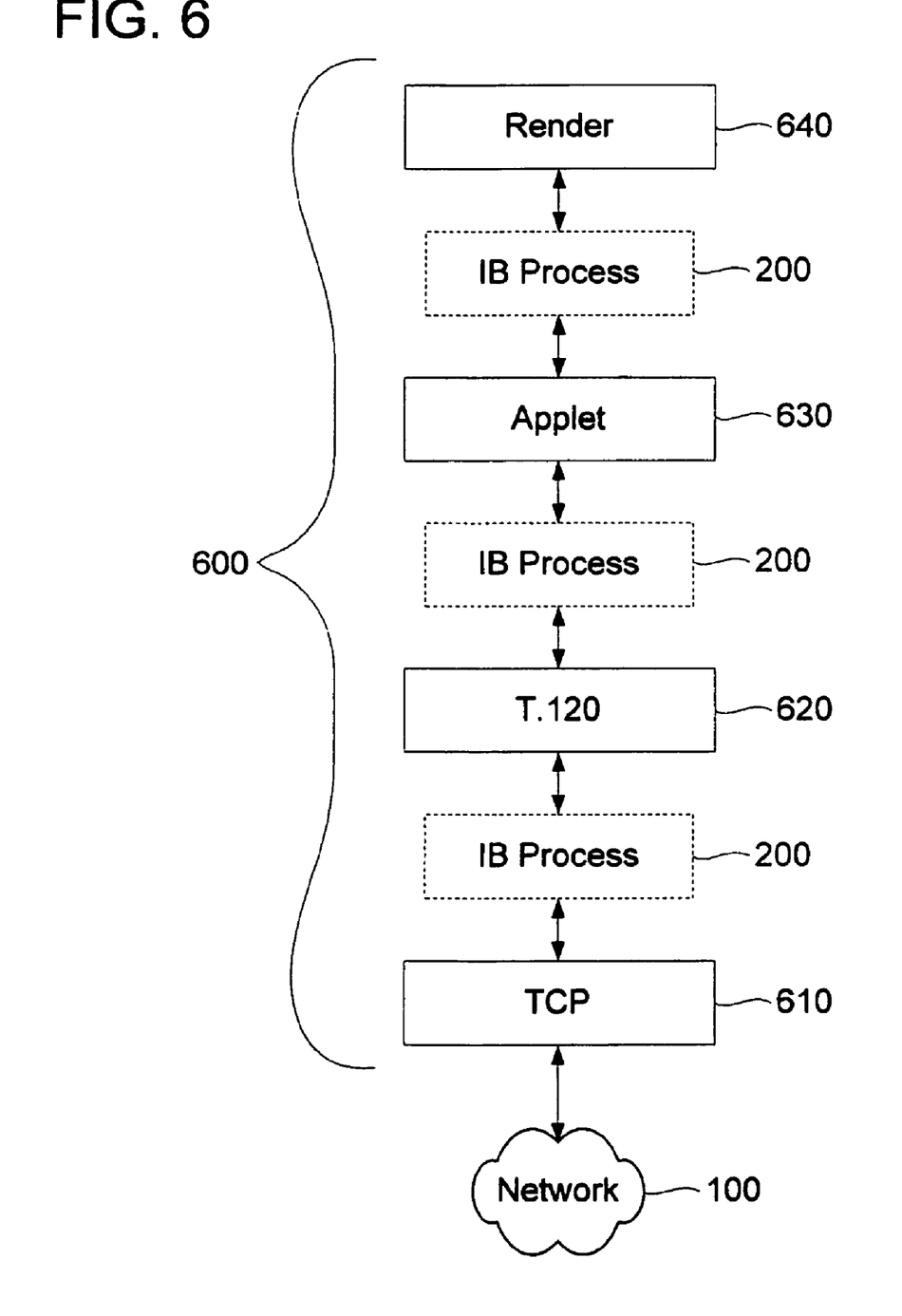
FIG. 6 is a schematic diagram of a conference server having multiple out buffers corresponding to various respective attendee destinations.

Referring to FIG. 6, a stack 600 is illustrated representing various exemplary software layers 610, 620, 630, and 640 running, for example, on an attendee computer 20A-20N (FIG. 1) or on the MCU 120 (FIG. 1). The layers can include any protocol or application layers relating to the conferencing process. In the embodiment illustrated, for example, the stack 600 includes a network protocol layer, such as a TCP layer 610, a multipoint conferencing protocol layer such as the T.120 layer 620, an applet layer 630, and a render layer 640, which could be a multimedia player that displays the video on a monitor. The IB process 200 can be implemented within the stack 600 above the TCP layer 610 and between any or all of the layers 610, 620, 630 and/or 640. With current video stream encoding formats, it has been found that a buffer implementing the process 200 above the TCP layer 610 should be sized less than a megabyte, and that about 100 KB of memory is believed to be suitable.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. An intelligent buffering process to reduce lag in a conference video stream after a data forwarding delay, the stream including a plurality of packets defining either a key frame or a delta frame, the process comprising the steps of:
    providing a plurality of buffers at a conference server, each of the buffers corresponding to a respective attendee destination;
    receiving a newly arrived packet;
    for each of the plurality of buffers, determining, at a computer, whether the newly arrived packet is a key frame, wherein the key frame contains data to construct an entire frame image; and if the packet is a key frame:
        detecting whether a buffer has reached a predetermined limit and discarding all of a number of currently buffered packets in the buffer if the predetermined limit has been reached; and
        adding the newly arrived packet as the only packet in the buffer;
    determining that the newly arrived packet is a delta frame;
    automatically discarding the delta frame when the buffer contents have reached the predetermined limit;
    forwarding at least one packet from the buffer to reduce the buffer contents below the predetermined limit; and
    upon forwarding the at least one packet from the buffer to reduce the buffer contents below the predetermined limit, preventing distortion by continuing to discard subsequent consecutively arriving delta frames until a new key frame has been added to the buffer, wherein the new key frame prevents distortion by containing the data to construct an entire frame image, and wherein the delta frames cause the distortion by being encrypted to contain data representing only changes relative to an immediately preceding key frame or delta frame.

2. The intelligent buffering process of claim 1, wherein the at least one packet is forwarded from the buffer in the order received.

3. The intelligent buffering process of claim 2, wherein the forwarding step occurs as soon as downstream data traffic permits.

4. The intelligent buffering process of claim 2, wherein both the receiving step and forwarding step are executed above a network protocol level.

5. The intelligent buffering process of claim 2, wherein after the forwarding step the process includes transmitting the packets over a network.

6. The intelligent buffering process of claim 1, wherein the receiving step includes receiving packets sent from a conference attendee computer over the network.

7. An intelligent buffering process to reduce lag in a conference video stream after a data forwarding delay, the stream including a plurality of packets defining either a key frame or a delta frame, the process comprising the steps of:
    providing a plurality of buffers at a conference server, each of the buffers corresponding to a respective attendee destination;
    receiving a newly arrived packet;
    for each of the plurality of buffers, determining, at a computer, whether the newly arrived packet is a delta frame, and if so:
        detecting whether the previous packet was discarded, and, if so, discarding the newly arrived delta frame if the previous packet was discarded;
        detecting whether a buffer has reached a predetermined limit; and
        discarding the newly arrived packet if the buffer has reached the predetermined limit;
    forwarding at least one packet from the buffer to reduce the buffer below the predetermined limit; and
    upon forwarding the at least one packet from the buffer to reduce the buffer below the predetermined limit, preventing distortion by continuing to discard subsequent consecutively arriving delta frames until a new key frame has been added to the buffer, wherein the new key frame prevents distortion by containing the data to construct an entire frame image, and wherein the delta frames cause the distortion by being encrypted to contain data representing only changes relative to an immediately preceding key frame or delta frame.

8. The intelligent buffering process of claim 7, further comprising the step of adding the newly arrived delta frame packet to the buffer if the previous frame was not discarded and if the buffer has not reached the predetermined limit.

9. The intelligent buffering process of claim 7, further comprising:
    deleting packets from the buffer if the newly arrived packet is a key frame, and if the buffer has reached the predetermined limit; and
    adding the key frame to the buffer, wherein the key frame contains data to construct an entire frame image.

10. A process for managing a video conference among a plurality of attendee computers, the process comprising:
    providing a plurality of buffers at a conference server, each of the buffers corresponding to a respective attendee destination;
    receiving a newly arrived packet of a video stream, the packet defining respective key frames and delta frames, each of the key frames containing data to construct an entire frame image:
    determining whether the newly arrived packet is a key frame; if the packet is a key frame:
    discarding all of a number of currently buffered packets in the buffer if the buffer contents have reached a predetermined limit;
    adding the key frame as the only packet in the buffer;
    forwarding non-discarded packets from the buffer to the corresponding attendee destination;

determining that the newly arrived packet is a delta frame;

automatically discarding the delta frame when the buffer contents have reached the predetermined limit;

forwarding at least one packet from the buffer to reduce the buffer contents below the predetermined limit; and upon forwarding the at least one packet from the buffer to reduce the buffer contents below the predetermined limit, preventing distortion by continuing to discard subsequent consecutively arriving delta frames until a new key frame has been added to the buffer, wherein the new key frame prevents distortion by containing the data to construct an entire frame image, and wherein the delta frames cause the distortion by being encrypted to contain data representing only changes relative to an immediately preceding key frame or delta frame.

11. The process of claim 10, wherein after the forwarding of the non-discarded packets from the buffer to the corresponding attendee destination, the process includes transmitting the packets over a network to an attendee destination according to a verified-delivery protocol.

12. The process of claim 11, wherein the protocol is TCP/IP.

13. The process of claim 10, wherein the process further comprises providing at least one buffer at at least one of the attendee computers, said receiving, determining, discarding, and adding steps being performed by the attendee computer on the packets forwarded from the server.

14. The process of claim 10, wherein the process further comprises providing at least one buffer at at least one of the attendee computers, the attendee computer performing said receiving, determining, discarding, adding and forwarding steps on the packets prior to the receiving of packets by the server.

15. A non-signal computer-readable medium having computer-executable instructions for performing a process for managing a buffer, the process comprising:

providing a plurality of buffers at a conference server, each of the buffers corresponding to a respective attendee destination;

receiving packets of a video stream data, the packets defining a plurality of key frames and delta frames, each of the key frames containing data to construct an entire frame image;

for each of the plurality of buffers, determining whether a newly arrived packet contains a key frame; and if the packet is a key frame:

detecting whether the buffer contents have reached a predetermined limit and discarding all of a number of currently buffered packets in the buffer if the predetermined limit has been reached;

adding the key frame as the only packet in the buffer, determining that the newly arrived packet is a delta frame;

automatically discarding the delta frame when the buffer contents have reached the predetermined limit;

forwarding at least one packet from the buffer to reduce the buffer contents below the predetermined limit; and upon forwarding the at least one packet from the buffer to reduce the buffer contents below the predetermined limit, preventing distortion by continuing to discard subsequent consecutively arriving delta frames until a new key frame has been added to the buffer, wherein the new key frame prevents distortion by containing the data to construct an entire frame image, and wherein the delta frames cause the distortion by being encrypted to contain data representing only changes relative to an immediately preceding key frame or delta frame.

* * * * *